US012694257B2

(12) United States Patent
Mondal et al.

(10) Patent No.: US 12,694,257 B2
(45) Date of Patent: Jul. 28, 2026

(54) INCORPORATING DIGITAL CERTIFICATES IN SMART WEARABLE DEVICES

(71) Applicant: DigiCert, Inc., Lehi, UT (US)

(72) Inventors: Supratik Mondal, Pune (IN); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 67 days.

(21) Appl. No.: 18/744,926

(22) Filed: Jun. 17, 2024

(65) Prior Publication Data

US 2025/0342336 A1    Nov. 6, 2025

(51) Int. Cl.
*G06K 19/077* (2006.01)
*G06Q 20/32* (2012.01)
*G06V 40/13* (2022.01)
*H04L 9/40* (2022.01)

(52) U.S. Cl.
CPC ..... *G06K 19/07762* (2013.01); *G06Q 20/321* (2020.05); *G06V 40/13* (2022.01); *H04L 63/0823* (2013.01)

(58) Field of Classification Search
None
See application file for complete search history.

(56) References Cited

U.S. PATENT DOCUMENTS

| | | | |
|---|---|---|---|
| 2022/0116231 A1* | 4/2022 | Choi | G06Q 20/389 |
| 2023/0300129 A1 | 9/2023 | Hojjati et al. | |
| 2023/0344639 A1 | 10/2023 | Hojjati | |
| 2023/0344650 A1 | 10/2023 | Hojjati | |
| 2023/0385811 A1 | 11/2023 | Naidoo et al. | |

FOREIGN PATENT DOCUMENTS

| | | | | |
|---|---|---|---|---|
| CN | 114257410 A | * | 3/2022 | H04L 9/3268 |
| EP | 3641369 A1 | * | 4/2020 | G06F 21/34 |

* cited by examiner

*Primary Examiner* — Kristy A Haupt
(74) *Attorney, Agent, or Firm* — Baratta Law PLLC; Lawrence A. Baratta, Jr.

(57) ABSTRACT

Systems and methods are provided for establishing a trust framework with respect to smart wearable devices. In one implementation, a smart wearable device includes memory configured to store one or more certificates issued by a Certificate Authority (CA), wherein the one or more certificates enable a user of the smart wearable device to digitally verify his or her identity for performing a security-based action. The smart wearable device further includes a Near Field Communication (NFC) device configured to wirelessly link with a security terminal to perform the security-based action when the identity of the user is verified.

17 Claims, 6 Drawing Sheets

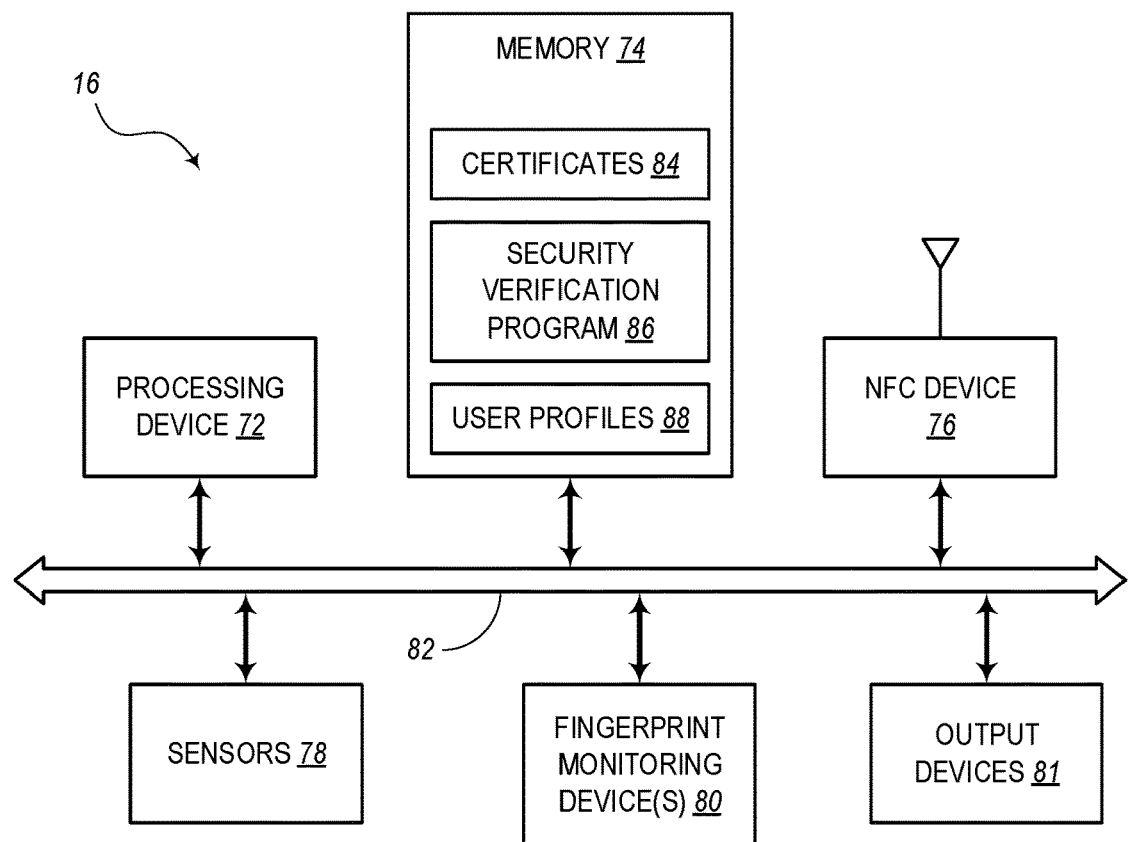
FIG. 4
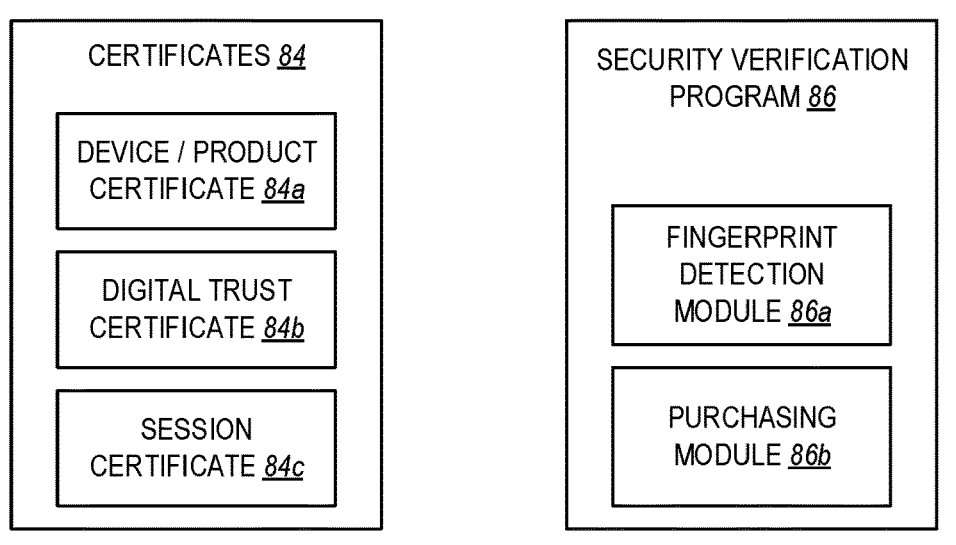
FIG. 5          FIG. 6

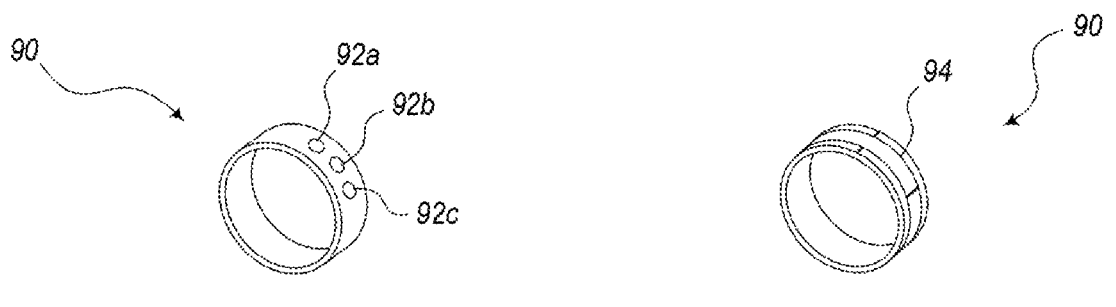
FIG. 7A            FIG. 7B
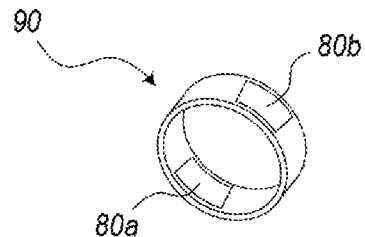
FIG. 7C
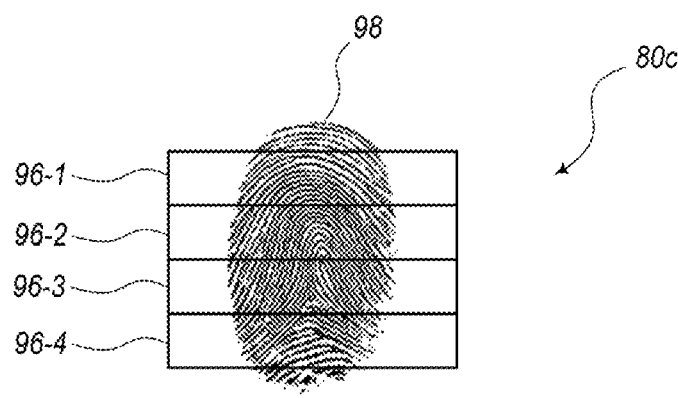
FIG. 8

INCORPORATING DIGITAL CERTIFICATES IN SMART WEARABLE DEVICES

FIELD OF THE DISCLOSURE

The present disclosure generally relates to computing networks. More particularly, the present disclosure relates to systems and methods for embedding digital certificates, such as X.509 certificates, in smart wearable devices to establish a security framework for financial, medical, and private use cases.

BACKGROUND

Smart wearable devices, such as smart rings and smart watches, are capable of allowing a user to perform a variety of operations. For example, a smart wearable device may be configured to monitor heart rate, monitor glucose levels, track sleeping patterns, measure oxygen saturation, measure body temperature, etc. However, most smart wearable devices are unable to perform certain types of actions related to the handling of sensitive data or are greatly limited in this respect. Some smart wearable devices can be used for purchasing merchandise in a contactless transaction. However, since conventional smart wearable devices are not part of a digital trust framework, they are typically designed such that a user must first pre-load the device with funds from a bank account before making a purchase. Because of this inherent deficiency, there can be little or no progression in the design capabilities of these devices with respect to security-based operations.

BRIEF SUMMARY

The present disclosure related to trust system for establishing a security framework in the field of smart wearable devices. According to one implementation, a smart wearable device includes memory configured to store one or more certificates issued by a Certificate Authority (CA). The one or more certificates enable a user of the smart wearable device to digitally verify his or her identity for performing a security-based action. Also, the smart wearable device includes a Near Field Communication (NFC) device configured to wirelessly link with a security terminal to perform the security-based action when the identity of the user is verified.

According to another implementation, CA system includes a processing device and memory configured to store computing logic. The computing logic includes instructions that, when executed, cause the processing device to perform a step of issuing one or more certificates to a smart wearable device to digitally certify an identity of the smart wearable device and a user of the smart wearable device. For example, the one of more certificates establish a security framework for digitally verifying the identity of the smart wearable device and user. The instructions further cause the processing device to issue a session certificate to the smart wearable device to enable the user to perform one or more security-based actions.

According to yet another implementation, a non-transitory computer-readable medium of a mobile device is configured to store logic having instructions that, when executed, enables a processing device to pair with a smart wearable device to enable Near Field Communication (NFC) with the smart wearable device. The instructions further enable the processing device to guide a user of the smart wearable device through a set-up procedure to download a digital certificate from a Certificate Authority (CA) to the smart wearable device. When the smart wearable device is linked with a security terminal, the digital certificate enables the user to perform one or more security-based actions when an identity of the user is verified.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram illustrating computing components of the smart wearable device shown in FIG. 1, according to various embodiments.

FIG. 5 is a block diagram illustrating the certificates shown in FIG. 4, according to various embodiments.

FIG. 6 is a block diagram illustrating the security verification program shown in FIG. 4, according to various embodiments.

FIGS. 7A-7C are diagrams showing the smart wearable devices configured as smart rings, according to various embodiments.

FIG. 8 is a diagram illustrating a fingerprint monitoring device that may be incorporated in a smart wearable device, according to various embodiments.

DETAILED DESCRIPTION

Trust System

Figure 1:
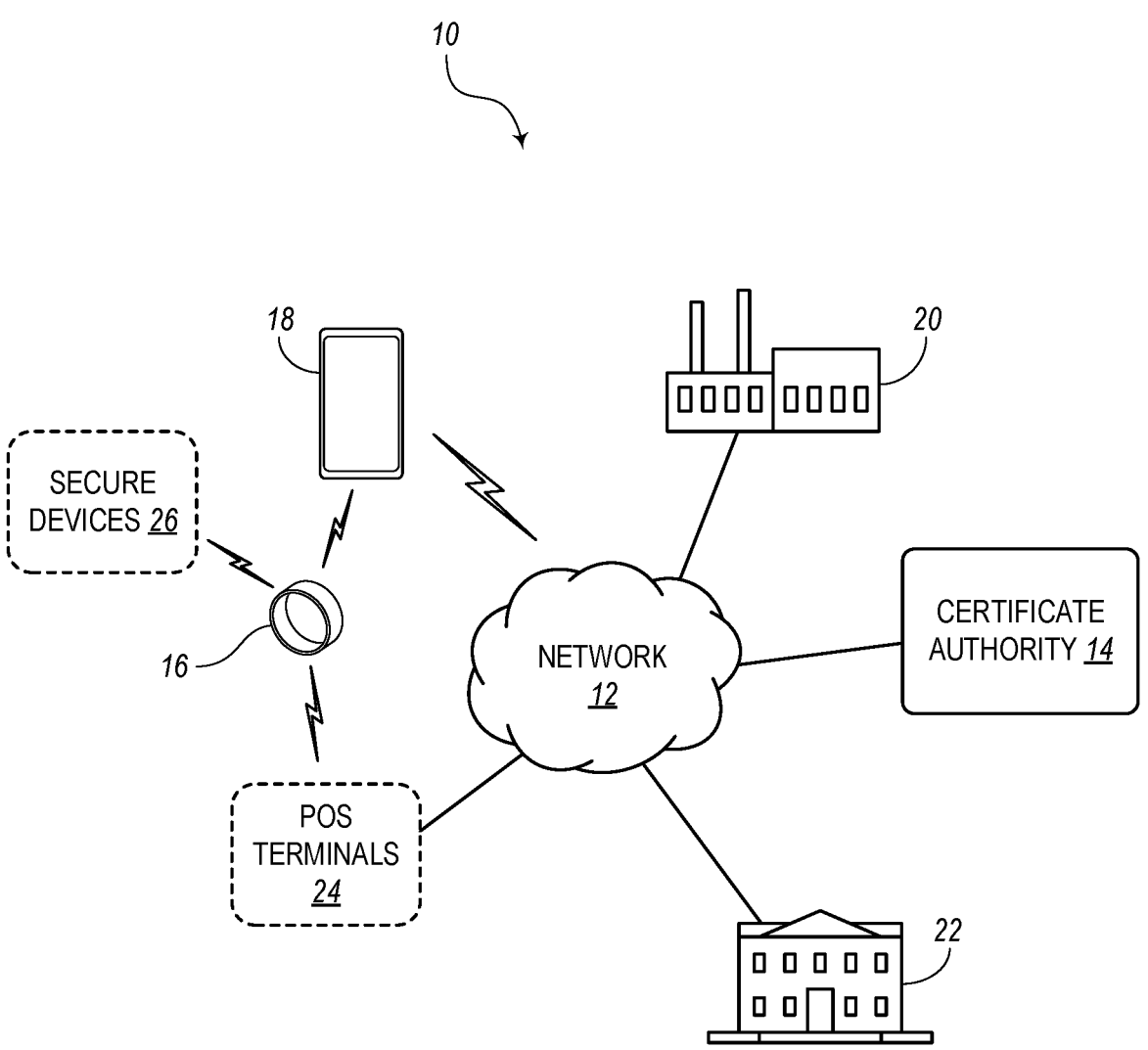
FIG. 1 is a diagram illustrating a trust system for establishing digital trust in a security framework with respect to smart wearable devices, according to various embodiments of the present disclosure.

FIG. 1 is a diagram illustrating an embodiment of a trust system 10 for establishing digital trust in a security framework with respect to smart wearable devices. As shown in FIG. 1, the trust system 10 may include communication over a network 12, which may include a Wide Area Network (e.g., the Internet), financial networks, cellular networks, etc. The trust system 10 may include a Certificate Authority 14 (CA) (e.g., DigiCert), which may be configured to issue digital certificates for a number of different purposes. According to the embodiments of the present disclosure, the CA 14 may be configured to specifically issue "device certificates" that identity various smart wearable devices 16, "digital certificates" that identity users of the smart wearable devices 16, "session certificates" that enable the user to perform certain sensitive or secure-type actions when one or both of the identities of the smart wearable devices 16 and users have been verified, and/or other types of certificates related to the verification of smart wearable devices 16 for performing sensitive, private, confidential, and/or secure operations. In addition, the trust system 10 may include a mobile device 18 (e.g., smart phone), which may be configured to operate with the smart wearable device 16 in some situations, particularly for assisting the users with setting up user profiles that can be stored on the smart wearable device 16.

Furthermore, the trust system 10 includes one or more factories 20 or other manufacturing facilities. In particular, the factories 20 may be configured to produce, build, manufacture, and/or assemble the smart wearable device 16 or at least produce certain parts used for making the smart wearable devices 16. In a first stage, the CA 14 may be configured to issue device certificates to the factories 20 that can be installed in the devices to verify that the devices are certified to meet certain industry standards and protocols.

In addition, the trust system 10 includes one or more banks 22 or financial institutions. The CA 14 may work with the banks 22 to establish a trust framework, where the banks 22 are able to recognize purchases made using the smart wearable devices 16 in a suitable manner. That is, the banks 22 may recognize that the purchases are performed within the limitations of a certificate issued by the CA 14, representing a trustworthy verification system. For example, banks 22 may now trust online purchases made through known platforms, such as Apple Pay, Google Pay, Samsung Pay, etc. However, the integrity of financial transactions overseen by the CA 14 can provide an aspect of trust during purchases with the smart wearable devices 16 when the user and smart wearable device 16 are identified or verified as legitimate.

Once the trust framework is established with the CA 14, factories 20, and banks 22, the trust system 10 is able to enable the factories 20 to produce certified products, such as smart wearable devices 16. Also, the banks 22 are set up to accept payment through one or more Point-of-Sale (POS) terminals 24 or cash registers, where a customer can purchase products. At this point, a retailer may obtain the smart wearable devices 16 from the factories 20 and sell them to different users.

Upon purchase, a user can then set up the smart wearable device 16, such as by using an application ("app") on the mobile device 18. Setting up the smart wearable device 16 may include entering personal information of the user (e.g., name, address, phone number, email address, etc.). In some embodiments, the smart wearable device 16 can be shared among a number of different users (e.g., members of a family, employees in a work environment, etc.), whereby entering personal information may include creating a user profile for each user. Setting up the smart wearable device 16 may also include entering bank or financial information (e.g., account names, passwords, account numbers, routing numbers, PINs, etc.) for each of one or more banks 22 associated with each user. In addition, setting up the smart wearable device 16 may include linking the smart wearable device 16 (and/or information contained therein) with one or more secure devices 26.

For example, the secure devices 26 may include access control terminals (e.g., physical gates, turnstiles, entryways, etc.) for controlling whether a person is allowed to enter a specific area. For example, a secure area may be a work room, building, or other space where only designated workers are allowed to enter. These areas may also be associated with a time calculating device for monitoring when each person enters the space or leaves the space, similar to a timeclock type of scenario. In another situation, a secure area may be movie theater (when a movie ticket is purchased), a bar (requiring a cover charge), a concert hall (when a concert ticket is purchased), or other venue where each individual entering some area is required to purchase a ticket or pay some type of fee.

In other embodiments, the secure devices 26 may be related to personal, confidential, private, or sensitive devices that may be associated with the user of the smart wearable device 16. In this scenario, these secure devices 26 may be medical devices (e.g., heart monitors, glucose meters, etc.) where sensitive health data may be shared only with an approved smart wearable device 16. The secure devices 26 may also include home security systems, baby monitors, and/or other types of devices where security information is not to be shared with outsiders.

After the smart wearable device 16 has been paired with the mobile device 18 (according to some embodiments), set up for operation with the user information entered, registered with the CA 14, certified, linked with bank accounts, linked with access control systems, etc., then the smart wearable device 16 can be used in a number of different ways to purchase products and services (using PoS terminals 24), enter restricted areas through secure devices 26 configured as access control gates, verify identity of medical information and security information from secure devices 26 configured as personal medical monitoring devices and security systems. Additional functions of the smart wearable device 16 within the realm of the trust system 10, operating within the novel security framework described herein, are described below, and may include further embodiments that can be conceived from an understanding of the present disclosure.

Certificate Authority

Figure 2:
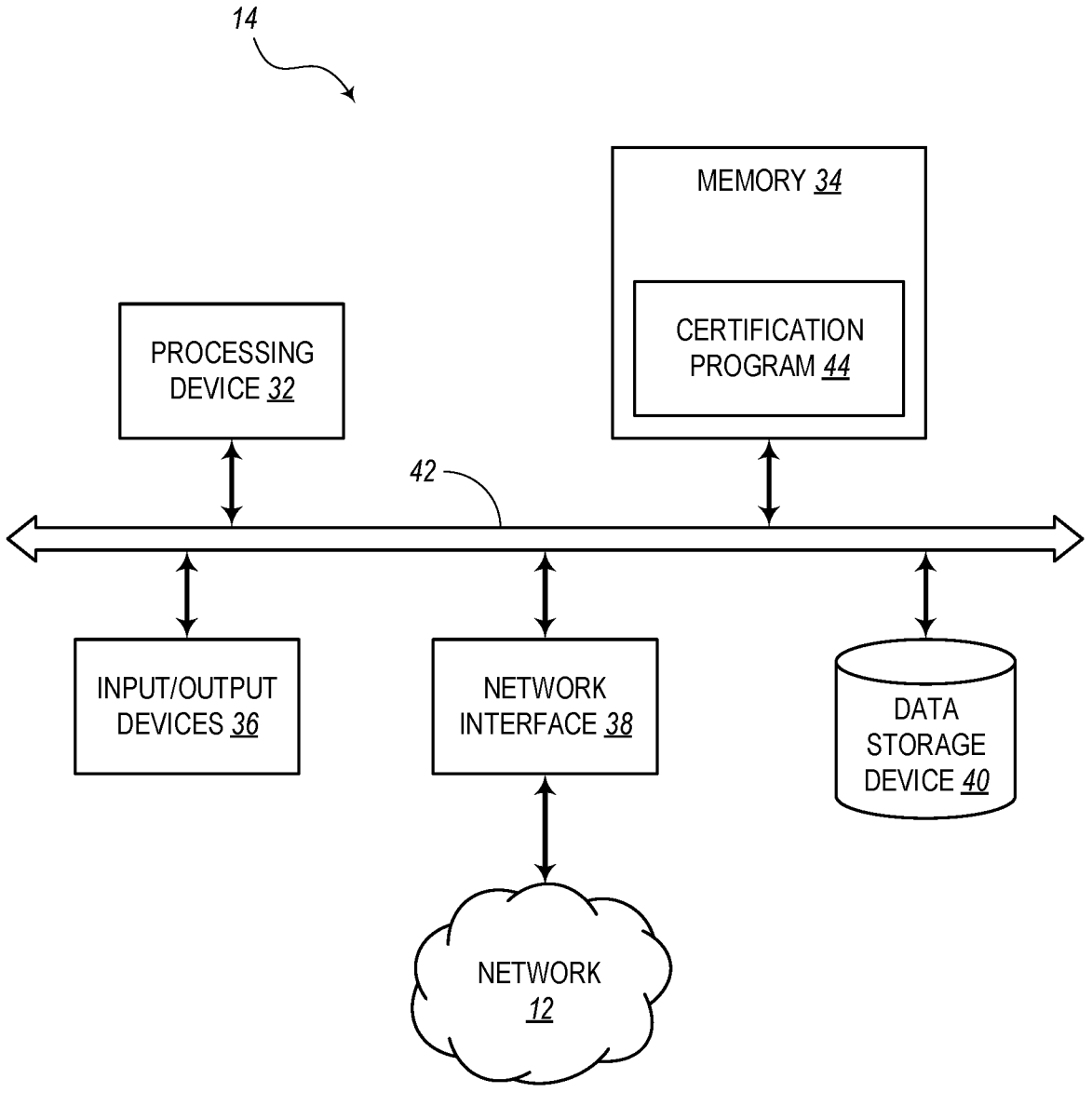
FIG. 2 is a block diagram illustrating computing components of the Certificate Authority (CA) shown in FIG. 1, according to various embodiments.

FIG. 2 is a block diagram showing an embodiment of digital computing components of the CA 14 shown in FIG. 1. According to various embodiments, the CA 14 generally includes a processing device 32, memory 34, input/output (I/O) devices 36, a network interface 38, and a data storage device 40. It should be appreciated by those of ordinary skill in the art that FIG. 2 depicts the CA 14 in a simplified manner, and a practical embodiment may include additional components and suitably configured processing logic to support known or conventional operating features that are not described in detail herein. The components (32, 34, 36, 38, 40) are communicatively coupled via a local interface 42. The local interface 42 may be, for example, but not limited to, one or more buses or other wired or wireless connections, as is known in the art. The local interface 42 may have additional elements, which are omitted for simplicity, such as controllers, buffers (caches), drivers, repeaters, and receivers, among many others, to enable communications. Further, the local interface 42 may include address, control, and/or data connections to enable appropriate communications among the aforementioned components.

The processing device 32 is a hardware device for executing software instructions. The processing device 32 may be any custom made or commercially available processor, a Central Processing Unit (CPU), an auxiliary processor among several processors associated with the CA 14, a semiconductor-based microprocessor (in the form of a microchip or chipset), or generally any device for executing software instructions. When the CA 14 is in operation, the processing device 32 is configured to execute software stored within the memory 34, to communicate data to and from the memory 34, and to generally control operations of the CA 14 pursuant to the software instructions. The I/O devices 36 may be used to receive user input from and/or for providing system output to one or more devices or components.

The network interface 38 may be used to enable the CA 14 to communicate on the network 12, such as the Internet. The network interface 38 may include, for example, an Ethernet card or adapter or a Wireless Local Area Network (WLAN) card or adapter. The network interface 38 may include address, control, and/or data connections to enable appropriate communications on the network. A data storage device 40 (e.g., one or more databases, data stores, etc.) may be used to store data. The data storage device 40 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data storage device 40 may incorporate electronic, magnetic, optical, and/or other types of storage media. In one example, the data storage device 40 may be located internal to the CA 14, such as, for example, an internal hard drive connected to the local interface 42 in the CA 14. Additionally, in another embodiment, the data storage device 40 may be located external to the CA 14 such as, for example, an external hard drive connected to the I/O devices 36 (e.g., SCSI or USB connection). In a further embodiment, the data storage device 40 may be connected to the CA 14 through a network, such as, for example, a network-attached file server.

The memory 34 may include volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 34 may incorporate electronic, magnetic, optical, and/or other types of storage media. Note that the memory 34 may have a distributed architecture, where various components are situated remotely from one another but can be accessed by the processing device 32. The software in memory 34 may include one or more software programs, each of which includes an ordered listing of executable instructions for implementing logical functions. The software in the memory 34 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The CA 14 further includes a certification program 44 that may be implemented in any suitable combination of hardware (e.g., configured in the processing device 32) and/or software/firmware (e.g., configured in the memory 34). The certification program 44 may be stored in any suitable non-transitory computer-readable media (e.g., the memory 34) and may include computer logic or code having instructions that enable or cause the processing device 32 to perform certain actions as discussed in the present disclosure. In particular, the certification program 44 may be configured to issue valid certificates to devices and users for identification purposes and for verifying the users and devices for proper use in various sensitive or confidential scenarios to provide trust with respect to certain actions when personal information, financial information, etc. is transmitted through the network 12 and/or when the user attempts to perform certain sensitive or confidential actions.

As mentioned throughout the present disclosure, the CA 14 may use the certification program 44 to issue product certificates or device certificates for verifying product information (e.g., serial number, product number, product type, product specifications, manufacturing date, etc.), where the product/device certificate can be issued when products (e.g., smart wearable devices 16) are manufactured. The certification program 44 may also issue digital certificates to owners, users, or wearers of the products or smart wearable devices 16. These digital certificates may be issued after the smart wearable device 16 is purchased and during a set-up phase. Furthermore, a "session certificate" may be incorporated in the smart wearable devices 16 and may be used during purchase using a PoS terminal 24, the description of which is described in more detail below.

Mobile Device

Figure 3:
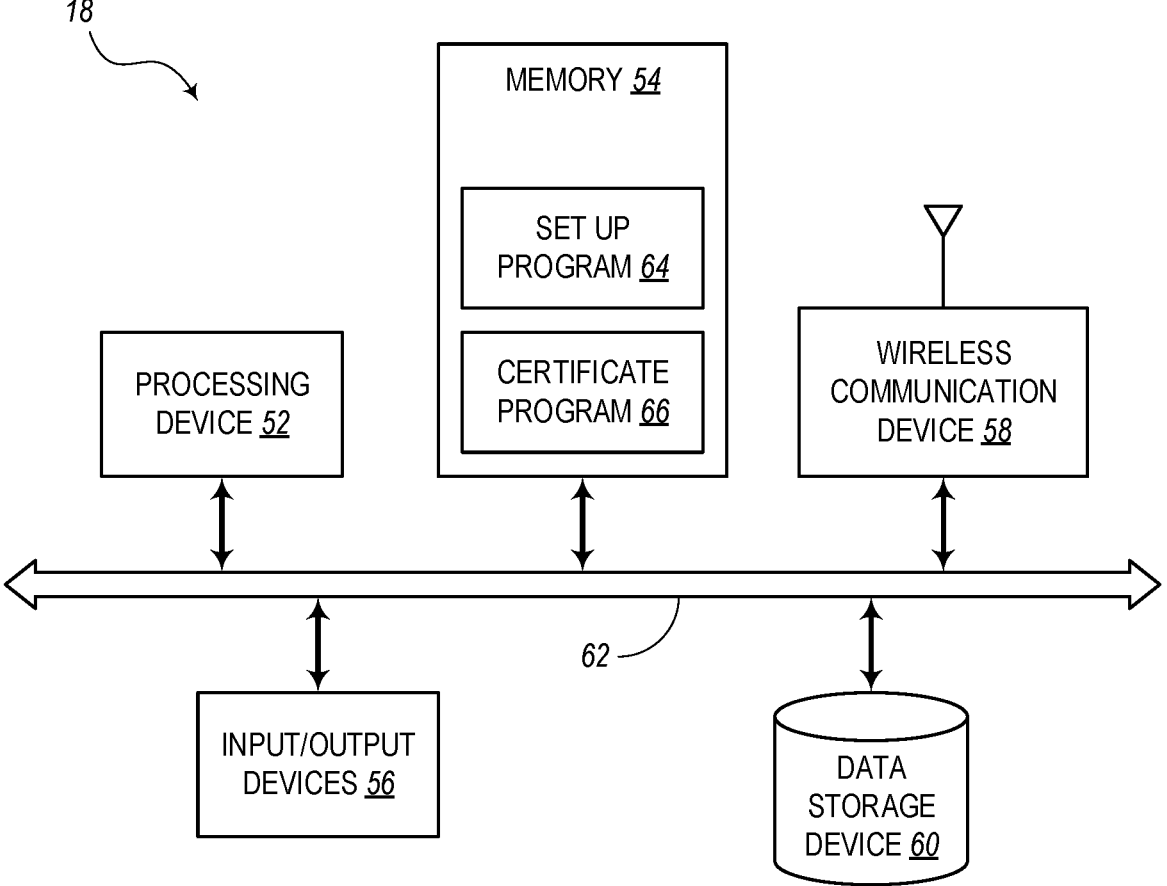
FIG. 3 is a block diagram illustrating computing components of the mobile device shown in FIG. 1, according to various embodiments.

FIG. 3 is a block diagram illustrating an embodiment of computing components of the mobile device 18 shown in FIG. 1. In this embodiment, the mobile device 18 generally includes a processing device 52, memory 54, I/O devices 56, a wireless communication device 58, and a data storage device 60. It should be appreciated by those of ordinary skill in the art that FIG. 3 depicts the mobile device 18 in a simplified manner, and a practical embodiment may include additional components and suitably configured processing logic to support known or conventional operating features that are not described in detail herein. The components (52, 54, 56, 58, 60) are communicatively coupled via a local interface 62. The local interface 62 may be, for example, but not limited to, one or more buses or other wired or wireless connections, as is known in the art. The local interface 62 may have additional elements, which are omitted for simplicity, such as controllers, buffers (caches), drivers, repeaters, and receivers, among many others, to enable communications. Further, the local interface 62 may include address, control, and/or data connections to enable appropriate communications among the aforementioned components.

The processing device 52 is a hardware device for executing software instructions. The processing device 52 may be any custom made or commercially available processor, a Central Processing Unit (CPU), an auxiliary processor among several processors associated with the mobile device 18, a semiconductor-based microprocessor (in the form of a microchip or chipset), or generally any device for executing software instructions. When the mobile device 18 is in operation, the processing device 52 is configured to execute software stored within the memory 54, to communicate data to and from the memory 54, and to generally control operations of the mobile device 18 pursuant to the software instructions. The I/O devices 56 may be used to receive user input from and/or for providing system output to one or more devices or components.

The wireless communication device 58 may be used to enable the mobile device 18 to communicate through a cellular network, which may be connected to the network 12 or the Internet. The wireless communication device 58 may include cellular transmitting and receiving devices and may include one or more antennas for communication with one or more cellular towers, satellites, etc. The wireless communication device 58 may include address, control, and/or data connections to enable appropriate communications on the network 12. The data storage device 60 (e.g., one or more databases, data stores, etc.) may be used to store data. The data storage device 60 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data storage device 60 may incorporate electronic, magnetic, optical, and/or other types of storage media. In one example, the data storage device 60 may be located internal to the mobile device 18, such as, for example, an internal hard drive connected to the local interface 62 in the mobile device 18. Additionally, in another embodiment, the data storage device 60 may be located external to the mobile device 18 such as, for example, an external hard drive connected to the I/O devices 56 (e.g., SCSI or USB connection). In a further embodiment, the data storage device 60 may be connected to the mobile device 18 through a network, such as, for example, a network-attached file server.

The memory 54 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 54 may incorporate electronic, magnetic, optical, and/or other types of storage media. Note that the memory 54 may have a distributed architecture, where various components are situated remotely from one another but can be accessed by the processing device 52. The software in memory 54 may include one or more software programs, each of which includes an ordered listing of executable instructions for implementing logical functions. The software in the memory 54 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The mobile device 18 further includes a set up program 64 and a certificate program 66 that may be implemented in any suitable combination of hardware (e.g., configured in the processing device 32) and/or software/firmware (e.g., configured in the memory 34). The set up program 64 and certificate program 66 may be stored in any suitable non-transitory computer-readable media (e.g., the memory 54) and may include computer logic or code having instructions that enable or cause the processing device 52 to perform certain actions as discussed in the present disclosure.

The set up program 64 may be an app that can be opened up on a screen of the mobile device 18 and may be configured to guide a user through a set up procedure. For example, the set up procedure allows the owner to enter a user profile for himself or herself. Also, in some embodiments, the set up procedure may allow entry of multiple user profiles to allow the owner to share the smart wearable device 16 with related members (e.g., family members, colleagues, different work-shift groups, etc.). For example, identification of the particular user may be based on scanning a fingerprint of the user while he or she is putting the smart wearable device 16 onto his or her body. In the case of the smart wearable device 16 being a smart ring, the fingerprint sensor can detect the user's fingerprint as the smart ring is being placed on the finger. Also, as described in more detail below, during a purchasing process, the wearer can move the smart ring to the fingertip to re-scan the fingerprint. This action is intended to initiate an embedded "session certificate" that allows a purchase to be made, as long as the purchase meets preset criteria (e.g., below a spending limit, within a geofence, certain types of purchases or items, etc.). Also, another limitation is a time limit that allows a purchase within a certain timeframe (e.g., three minutes, five minutes, ten minutes, fifteen minutes, or other preset setting).

Furthermore, the certificate program 66 may be configured during the set-up procedure to collect the personal information or user profile information (e.g., names, addresses, phone numbers, bank accounts, fingerprint details, photos of government-issued ID cards, access control areas, etc.) for each user and deliver this information to the CA 14. In this way, the CA 14 can issue a digital certificate or user certificate for identifying the users and enabling a verification of the users (e.g., using the users' fingerprints). In some cases, the mobile device 18 may be configured to forward session certificate information between the CA 14 and smart wearable device 16.

Smart Wearable Devices

FIG. 4 is a block diagram illustrating computing components of the smart wearable device 16 shown in FIG. 1. In the embodiment shown in FIG. 4, the smart wearable device 16 may be configured to generally include a processing device 72, memory 74, a Near Field Communication (NFC) device 76, sensors 78, one or more fingerprint monitoring devices 80 (or fingerprint sensors), and one or more output devices 81. It should be appreciated by those of ordinary skill in the art that FIG. 4 depicts the smart wearable device 16 in a simplified manner, and a practical embodiment may include additional components and suitably configured processing logic to support known or conventional operating features that are not described in detail herein. The components (72, 74, 76, 78, 80, 81) are communicatively coupled via a local interface 82. The local interface 82 may be, for example, but not limited to, one or more buses or other wired or wireless connections, as is known in the art. The local interface 82 may have additional elements, which are omitted for simplicity, such as controllers, buffers (caches), drivers, repeaters, and receivers, among many others, to enable communications. Further, the local interface 82 may include address, control, and/or data connections to enable appropriate communications among the aforementioned components.

The processing device 72 is a hardware device for executing software instructions. The processing device 72 may be any custom made or commercially available processor, a Central Processing Unit (CPU), an auxiliary processor among several processors associated with the smart wearable device 16, a semiconductor-based microprocessor (in the form of a microchip or chipset), or generally any device for executing software instructions. When the smart wearable device 16 is in operation, the processing device 72 is configured to execute software stored within the memory 74, to communicate data to and from the memory 74, and to generally control operations of the smart wearable device 16 pursuant to the software instructions.

The NFC device 76 may be configured to communicate with a nearby electronic device having compatible NFC functionality. For example, the smart wearable device 16 may communicate with the mobile device 18 via NFC signals when the smart wearable device 16 is brought within range of the mobile device 18. This pairing can allow the user to perform the set up procedure described with respect to the set up program 64 of the mobile device 18. The user information in each user profile (e.g., name, address, bank information, etc.) can be transmitted to the smart wearable device 16 via the NFC device 76 and stored in the memory 74. Also, when the smart wearable device 16 is used for making a purchase at a PoS terminal 24, the user can tap the smart wearable device 16 on an NFC-enabled portion of the PoS terminal 24 to initiate a payment process. The POS terminal 24 can receive payment information (e.g., bank information, credit card information, etc.) from the NFC device 76 and perform validation of the payment (e.g., ensure that the bank account has sufficient funds, etc.). The NFC device 76 may also be used in situations involving the secure devices 26 (e.g., personal medical devices, home security systems, baby monitors, area access control devices, etc.), where a proper link to the secure device 26 can allow the user to perform some secure, confidential, restricted, or personal action.

The sensors 78 may include any suitable monitoring devices for monitoring any number of conditions while the smart wearable device 16 in on the body (or finger) of the wearer. For example, the sensors 78 may include heart rate monitors, glucose monitoring or blood sugar monitoring devices (e.g., glucometers), body temperature monitors, accelerometers for measuring motion (e.g., step trackers, fall detection monitors, etc.), sleep monitors, oxygen saturation (SpO2) sensors, ultrasonic sensors, Global Positioning System (GPS) tracker (e.g., for geofencing applications), and so on.

Another type of sensor of the smart wearable device 16 is the one or more fingerprint monitoring devices 80. As shown in FIG. 7C, a smart wearable device 16 may be configured as a smart ring and may include at least one fingerprint sensor 80a on an inside of the smart ring for monitoring the fingerprint of the finger on which the smart ring is placed. For example, the fingerprint sensor 80a may be used when the user is first placing the smart ring on the finger to allow the smart ring to identify the particular user. Also, this fingerprint sensor 80a may be used when the wearer initiates a certain type of payment process, as described in more detail below. Furthermore, the smart ring (as shown in the FIG. 7C embodiment) may include at least one other type of fingerprint sensor 80b that may be positioned on an outside of the smart ring. In this embodiment, the fingerprint sensor 80b may be used when the wearer places a finger (e.g., index finger) on his or her other hand over the fingerprint sensor 80b or engages this fingerprint sensor 80b in a swiping-type motion.

Also, the smart wearable device 16, as shown in FIG. 4, includes one or more output devices 81, such as one or more Light Emitting Diode (LED) elements. The LED elements may be configured to illuminate in any suitable fashion (e.g., constantly on, flashing, fading in and out, etc.) and using any color or combinations of colors. For example, when a user first puts the smart wearable device 16 onto his or her body (e.g., on a ring finger), a fingerprint of the wearer may be detected. If the fingerprint matches one of the fingerprints stored in the user profiles, then the smart wearable device 16 can detect who is wearing the device and use his or her user profile. Any actions (e.g., financial transactions, health-related actions, access control, etc.) of the wearer can therefore be attributed to that wearer who is identified when it is first placed on the body. The LED devices may shine a green light to indicate that the user has been properly identified, or the LED devices may shine a red (or yellow) light to indicate that the user has not been identified. Although the smart wearable device 16 may still allow an unidentified user to use the device in some situations, the user will not be able to perform any sensitive-type actions, such as making a financial transaction, gaining access to a restricted area, etc.

The memory 74 may include volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 74 may incorporate electronic, magnetic, optical, and/or other types of storage media. Note that the memory 74 may have a distributed architecture, where various components are situated remotely from one another but can be accessed by the processing device 72. The software in memory 74 may include one or more software programs, each of which includes an ordered listing of executable instructions for implementing logical functions. The software in the memory 74 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The smart wearable device 16 further includes certificates 84, a security verification program 86, and user profiles 88. The security verification program 86 may be implemented in any suitable combination of hardware (e.g., configured in the processing device 72) and/or software/firmware (e.g., configured in the memory 74). The security verification program 86 may be stored in any suitable non-transitory computer-readable media (e.g., the memory 74) and may include computer logic or code having instructions that enable or cause the processing device 72 to perform certain actions as discussed in the present disclosure.

FIG. 5 is a block diagram illustrating an embodiment of the certificates 84 that may be stored in the memory 74, as shown in FIG. 4. For example, the certificates 84 may include a device or product certificate 84a, which may be issued by the CA 14 during manufacturing (e.g., at the factory 20). Another certificate 84 that may be stored in the memory 74 is a digital trust certificate 84b, which may be issued by the CA 14 when the owner purchases the smart wearable device 16 and performs a set-up procedure to enter personal identification information for creating a user profile 88 for each user/wearer (e.g., name, address, social security number, driver's license number, bank account information, etc.). In some embodiments, the mobile device 18 may be configured to assist with transferring the digital trust certificate 84b from the CA 14 to the smart wearable device 16. Furthermore, as shown in FIG. 5, the certificates 84 may include a session certificate 84c, which may be used for conducting a financial transaction. The session certificate 84c may include device certification procedures, user validation procedures, and other actions. Additional details of the session certificate 84c are described below.

FIG. 6 is a block diagram illustrating an embodiment of the security verification program 86 that may be stored in the memory 74, as shown in FIG. 4. For example, the security verification program 86, according to some embodiments, may include a fingerprint detection module 86a and a purchasing module 86b. The fingerprint detection module 86a may be used for detecting and storing valid fingerprints for each of the users when creating user profiles 88. Also, the fingerprint detection module 86a may be used during confidential or private operations that require a fingerprint validation of the user for security purposes. Again, these security reasons may be related to financial transactions, entering a restricted or limited-access area, using private electronic equipment (e.g., home security system, baby monitor, medical or health monitoring devices, etc.), etc. The purchasing module 86*b* may include a specific process for verifying information related to a purchase or other type of financial transaction/transfer. For example, the purchasing module 86*b* may be configured to work with the PoS terminals 24 for communicating needed secure information (e.g., bank account information, name, user's photograph, fingerprint verification, etc.).

Smart Rings and Fingerprint Sensors

FIGS. 7A-7C are diagrams showing an embodiment the smart wearable device 16 in which it is configured as a smart ring 90. It should be noted that the smart wearable device 16 may have any suitable form factor (e.g., ring, headgear, wrist band, bracelet, watch, necklace, angle bracelet, clothing, shoes, undergarments, piercings, etc.). However, for the sake of simplicity, particularly with respect to obtaining a user's fingerprint, the form factor of a smart ring 90, as shown in FIGS. 7A-7C, is described herein.

As shown in FIG. 7A, the smart ring 90 may include a substantially cylindrical shape. In other embodiments, the smart ring 90 may include any suitable shape that surrounds at least a portion of a wearer's finger (or thumb or toe). The smart ring 90 may include a complete continuous band, but, in other embodiments, the band may wrap only a fraction of the circumference of the finger and/or may wrap around the finger more than one revolution (in a spiraling manner). In FIG. 7A, the smart ring 90 includes LED indicators 92*a*, 92*b*, 92*c* (e.g., green, yellow, red) or other of the output devices 81 described with respect to FIG. 4.

As shown in FIG. 7B, the smart ring 90 may include a feature, such as an adjustable band 94, which allows different users to adjust the band to an appropriate size to fit the particular user. Therefore, if the smart ring 90 is configured to be used by multiple users, each user can change the diameter of the smart ring 90 by adjusting the size of the adjustable band 94 for the right fit.

As shown in FIG. 7C, the smart ring 90 may further include a first fingerprint sensor 80*a* and a second fingerprint sensor 80*b* (e.g., fingerprint monitoring devices 80). In some embodiments, the first fingerprint sensor 80*a* can be used when a user first places the smart ring 90 on his or her finger. As the smart ring 90 slides onto the finger, the first fingerprint sensor 80*a* may scan the fingerprint at once or in stages, depending on different configurations. Also, when a purchase is being made, the user can pull the smart ring 90 to the fingertip and re-scan the fingerprint (of the ring finger on which the smart ring 90 is placed). If the re-scanning is successful (during the purchase process), the green LED indicator 92*a* may be illuminated. Otherwise, the yellow or red LEDs indicators 92*b*, 92*c* may be illuminated. In this case, the session certificate 84*c* can be utilized for allowing the financial records to be retrieved for making the purchase when the smart ring 90 is later tapped on the PoS terminal 24. Again, the user may be limited in some respects, based on various settings entered during the set-up stage. For instance, the user may be given a certain amount of time to tap the PoS terminal 24 to initiate the purchase. Otherwise, the session certificate may terminate the purchase process and the user will need to rescan the fingerprint again. The time-out may be set to any suitable length of time (e.g., two minutes, three minutes, five minutes, etc.).

Furthermore, the second fingerprint sensor 80*b* may be used without requiring the user to slide the smart ring 90 to the fingertip and rescan the fingerprint of the ring finger (or whatever finger the smart ring 90 is placed on). Instead, the user may use a finger (e.g., index finger) on the other hand to scan this fingerprint using the second fingerprint sensor 80*b*. Again, the fingerprint may be obtained at one time or may be obtained in stages if the finger is swiped across the second fingerprint sensor 80*b*. Also, this second fingerprint sensor 80*b* may also be used to initiate the session associated with the session certificate and may also include a time limit for activation with the POS terminal 24.

FIG. 8 is a diagram illustrating an embodiment of another fingerprint sensor 80*c* that may be incorporated in the smart wearable device 16, smart ring 90, or other smart device. In this embodiment, the fingerprint sensor 80*c* includes four sections 96-1, 96-2, 96-3, 96-4, where each section 96 may be configured to sense one portion of a fingerprint 98. According to other various embodiments, the fingerprint sensor 80*c* may have fewer than four sections 96 or more than four sections 96. In some embodiments, the section 96 may detect an adequate amount of the fingerprint 98 at one time where the user can leave his or her finger on the fingerprint sensor 80*c* for detecting the fingerprint in one step. In other embodiments, the user may swipe the finger (e.g., in a slow, steady motion) across the four sections 96-1, 96-2, 96-3, 96-4 so that each section can detect one portion at a time and the entire fingerprint 98 can be obtained by processing the various images or patterns to identify the individual.

Using the Smart Rings

Figures 9, 10, 11A, 11B:
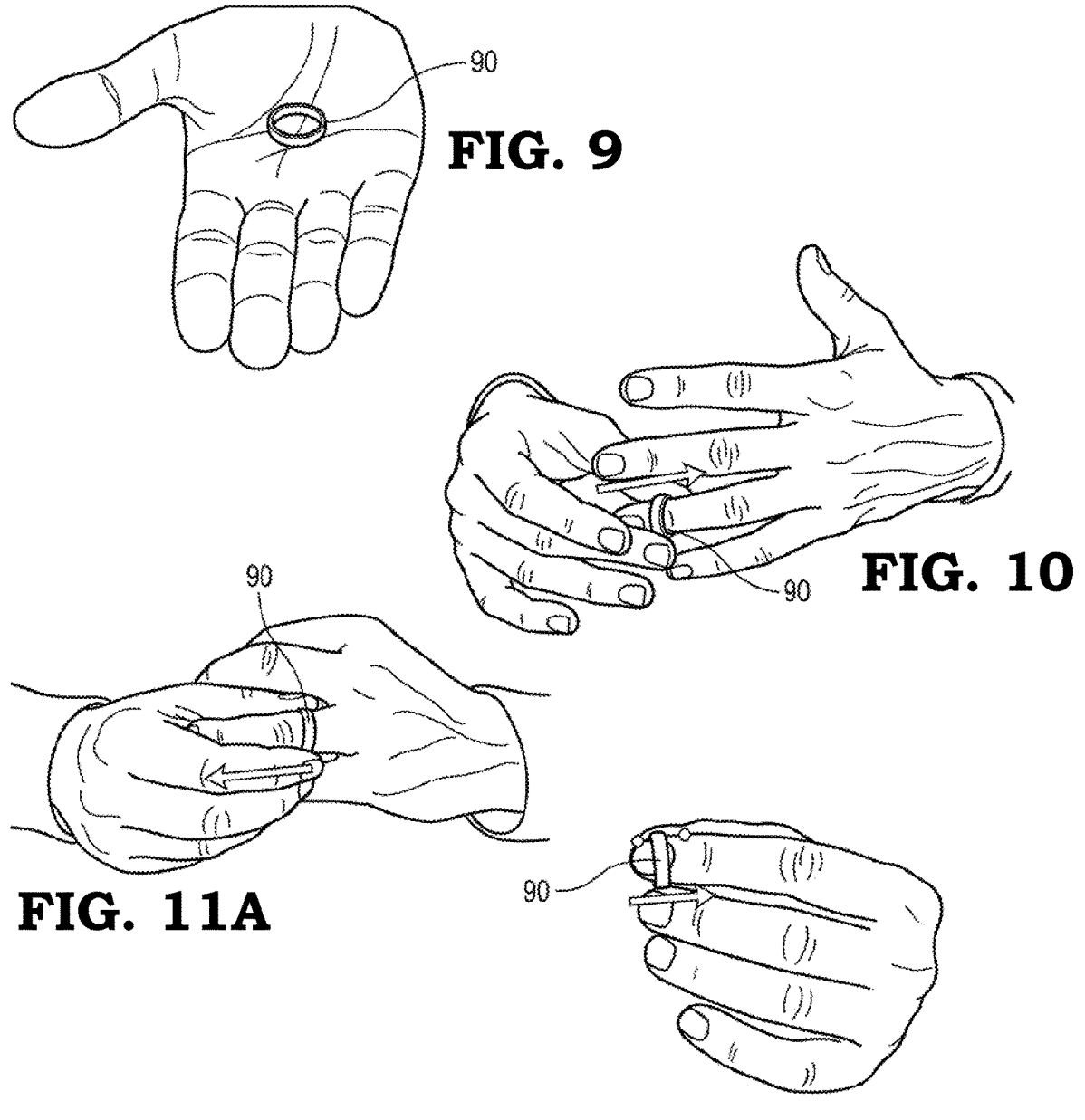
FIG. 9 is a diagram illustrating an example of a smart ring before being placed on a user's finger.
FIG. 10 is a diagram illustrating an example of the smart ring being initially placed on the user's finger.
FIG. 11A is a diagram illustrating an example of the start of a session certificate when a user begins to slide the smart ring to the end of the user's finger.
FIG. 11B is a diagram illustrating an example of a next step in the session certificate when a fingerprint monitoring device of the smart ring is used to scan the user's fingerprint.

FIGS. 9, 10, 11A, and 11B show examples of the smart ring 90 in various conditions. For example, in FIG. 9, the smart ring 90 is shown before it is placed on a user's finger. One of the sensors 78 of the smart ring 90 may include proximity sensor, capacitance sensor, etc. that is configured to detect whether the smart ring 90 is on or off. For example, the sensor 78 may measure a dielectric to determine the presence of a finger within the band of the smart ring 90. In FIG. 9, the dielectric measurement may detect that the smart ring 90 is off and may therefore turn the power off, turn the smart ring to battery saving mode, etc. Also, in the off mode, the smart ring 90 may be configured not to perform any sensitive actions (e.g., financial transactions, transmission of personal information, enabling access, etc.).

In FIG. 10, the smart ring 90 is placed on the finger (e.g., ring finger) of the user. Again, at this stage, the smart ring 90 may be configured to obtain the fingerprint 98 of the individual (e.g., using the first fingerprint sensor 80*a*) and attempt to match the fingerprint 98 with a fingerprint stored in one of the user profiles 88. The green LED indicator 92*a* may show a successful fingerprint scan and/or a successful fingerprint match. After a certain time, the smart ring 90 may then illuminate the yellow LED indicator 92*b* to show that the smart ring 90 is on and ready for operation. In some situations, the user may wish to wear the smart ring 90 at all times. The LED indicators may be turned off to conserve power after a certain time delay with no activity. In other situations, the smart ring 90 may be configured to detect health conditions at all times to track steps taken, to constantly monitor heart rate, to constantly monitor body temperature, etc.

According to some embodiments, the user may eventually wish to activate certain security-based operations of the smart ring, such as preparing the smart ring 90 to make a financial transaction with a PoS terminal 24. In FIG. 11A, the wake-up or secure action initiation may include the user pulling the smart ring 90 from the base of the finger. Then, as shown in FIG. 11B, the user may move the smart ring to the end of the finger and then move the smart ring 90 in the direction of the arrow to scan the fingerprint. If the fingerprint is successfully obtained and/or matched, the LED indicator 92a may shine green to show success. Again, the financial clock may be started to conduct the purchase. When a PoS terminal 24 successfully completes the transaction, it may provide a confirmation to the smart ring. The LED indicators 92 may illuminate a certain pattern to show the completion of the monetary exchange or bank debit.

Additional Embodiments

Smart wearable devices may also be referred to as smart wearables, wearables, wearable technology, wearable devices, wearable gadgets, smart jewelry, smart watches, smart rings, smart bands, smart clothing, or other names, referring to any electronic device that can be worn on any part of the user's body, embedded in a body piercing element, and/or embedded under the skin of the user. A problem with conventional smart wearable devices is that they do not normally include any digital trust framework. However, the smart wearable devices 16 of the present disclosure are configured to establish Digital Trust in the eco-system of sustainable and reusable smart devices. Currently, there are multiple conventional Smart Rings available in the market from different vendors. Primarily, these Smart Rings may be used for contactless payments, similar to a user tapping a credit card or debit card into a PoS terminal 24 for making a payment. Similarly, a user wearing the Smart Ring can make a first gesture while tapping on the POS terminal 24.

Issues with Conventional Smart Rings

However, the conventional Smart Rings have many shortcomings.

A) Lack of Digital Trust in Smart Rings—Banks in general do not trust conventional Smart Rings (from any manufacturer) for directly linking with bank accounts and making PIN, One-Time-Password (OTP), and/or OTP-less payments. In the conventional methodologies, the user has to load money from his or her bank account into the Smart Ring account associated only with the manufacturer's Prepaid Wallet in order to make transactions using the Smart Ring.

B) Vendor Lock-in—Few Banks provide Payment Rings to users which can be directly used for making transactions without the need for a separate Prepaid Wallet. Since these Smart Rings are manufactured with a specific Vendor Tie-Up (i.e., exclusively tying a specific Smart Ring Vendor to a specific Bank). Hence, the user has no choice of switching to other manufacturers that might have better features or designs if he or she wants to use it with the same Bank account.

C) Lack of convergence—If the user has accounts in multiple different Banks, then the user would need to buy multiple different Smart Rings and wear them all to have access to the various accounts. This, of course, can be burdensome to a user, especially if the user regularly makes multiple transactions from all accounts.

D) PIN Requirement—Smart Rings are normally meant to be used without requiring the user to enter a PIN into the POS terminal 24. Eliminating this extra step can enhance the user experience as compared with regular debit cards. However, due to lack of security and trust with conventional Smart Rings, Banks always mandate usage of the PIN or an OTP before making a transaction using the Smart Ring, particularly a larger transaction. If the user forgets the PIN or enters it incorrectly several times, then the user experience can of course decline.

E) Lack of Security—Entering PINs in public places may be unsafe in certain areas. If a malicious person is able to hack the PIN or OTP and snatch the Ring from owner, then illegal payments can be done before the user gets a chance to block the Smart Ring.

F) No Multi-user support—Most conventional Smart Rings are intended for use by a single individual. High-end Payment Rings can be beautifully designed and perceived as jewelry. In some cases, an owner may wish to share jewelry with a close family member or friend. However, conventional Smart Rings do not have the capability of being shared and/or using different user profiles for different users. Therefore, they are typically strictly configured for a single user and do not provide any support for multi-user scenarios.

G) Brand Ecosystem Lock-in—Big Consumer Electronics Brands (e.g., Apple, Samsung, Boat, etc.) tend to continue increasing hardware capabilities in their Smart Rings, such as by adding more sensors, more battery capacity, more software features, etc. They also implement tight integration within their own Ecosystem of products and therefore discourage customers from using Smart Rings outside of their Ecosystem. For example, the Apple Ring has seamless integration with Apple Vision Pro, Apple Pay, iPhones, etc., while Samsung Galaxy Ring has seamless integration with their Samsung Smart Home Appliances, Samsung Galaxy phones, Samsung Smart TVs, etc.

In some respects, the above practices of the conventional Smart Rings are indirectly creating monopolies in the consumer durables market and discourage start-ups from entering the field. Any new manufacturer who does not have similar Brand Ecosystem will likely fail to provide universal usage experience and seamless integration with different brand ecosystems.

H) Lack of Guest Profile/Parental Control—In general, conventional Smart Rings, like debit cards, are meant to be used by a single person. First of all, many conventional Smart Ring have a fixed size and cannot be easily shared with someone with a different ring size. Also, if the Smart Ring is to be shared with a family member, for example, an owner (e.g., parent) may wish to have full control of the Smart Ring if it is used by a child (or spouse). The owner would need to share the PIN of the Smart Ring, debit card, etc. However, the conventional systems do not create a situation where a Smart Ring can be used in a "Guest Mode," which can be an option with respect to the embodiments of the present disclosure, as described below.

Present Solutions to the Conventional Problems

Therefore, the systems and methods of the present disclosure are configured to overcome issues A-H described above. Solutions A-H described below are configured to solve the issues and thereby provide more flexibility in the use of smart wearable devices, more security for making financial transactions and performing other secure or confidential actions, encourage free market development of smart wearable devices from more vendors or manufacturers, and provide an easily user experience. The embodiments described in the present disclosure may include enhanced security capabilities based on Device Certificates and Session Certificates. The smart wearable devices may have flexible sizes and may include all the existing features of other Smart Rings in the market. The embodiments of the smart wearable devices may include one or more embedded rechargeable batteries and/or a magnetic charging capability.

Solutions A-H described below overcome the issues A-H described above with respect to the conventional Smart Rings:

A) Enabling Digital Trust in smart wearable devices—Using a combination of public Certificate Authority (public CA)+ Device Certificate+ a fingerprint sensor, the smart wearable devices are able to provide user verification+ a short-lived Session Certificate for performing sensitive, secure, personal, private, or confidential actions (e.g., financial transactions, entering restricted area, obtaining video feed of baby monitor or home security system, using health monitoring devices, etc.). For example, with a trusted CA providing a certification system for verifying identity and authentication in the manner described in the present disclosure, each payment transaction can be trusted by any bank.

Also, the smart wearable devices may include processing systems for in-depth auditing capabilities of each payment transaction, which can be used in an organized spreadsheet or display for showing itemized purchases, which may include the purchasing user, the products or services purchased, the purchase amount, the purchase date, budget category of product, etc. This information can be used for separating purchases based on different parameters and for further analysis (e.g., fraud detection and prevention).

Therefore, the smart wearable devices of the present disclosure and configured to enable digital trust in the smart wearable device ecosystem so that any manufacturer can launch a "Universal Smart Ring," which can be trusted by all banks and can be used directly without the need for the additional Prepaid Wallets of the conventional systems, which can be inconvenient and time-consuming.

B) Removing the Vendor Lock-in—Banks do not need to establish an exclusive partnership with a specific manufacturer. This allows any manufacturer to launch a new smart wearable device that can gain support of bank and bank accounts by merely trusting in the CA and the certificates provided thereby. Just like a single smartphone can be used to operate multiple bank accounts, the field of smart wearable designs, while using the security framework embodiments described in the present disclosure, are now able to operate with multiple banks and bank accounts.

C) Convergence—One-to-Many relationship between a smart wearable device and multiple bank accounts are now possible with the systems and methods of the present disclosure.

D) No PIN or One-Time Password (OTP) Needed—PINs and OTPs required for conventional Smart Ring payment transactions (particularly those of higher values) are no longer needed. Instead, a more secure fingerprint verification process can be used to verify the user. Also, user consent can be set up and planned ahead of time to put certain limits on (or consent to) purchases as desired.

E) Enhanced Security—The fingerprint scanning process is a much more secure method for avoiding malicious activity. With some embodiments of user validation, a validation process may be performed along with the combination of more than one fingerprint verification (e.g., verifying two different portions of a fingerprint)+ a ring motion detection for Session Start and Session Stop activities+ binding with various health sensor metrics at the time of transaction+ GPS location. A Session Certificate may contain this information, which may be transferred to the POS terminal 24 the user taps the smart wearable device 16 for a payment activity. Thus, the bank 22 can collect and store this Session Certificate as a confirmation of the payment, allowing the bank 22 to have fine-grained control of payment-related data for further financial analysis.

F) Multi-user Support—It is believed that the multi-user capability is the first of its kind in the field of smart wearable devices and is therefore believed to be novel in its own right. With the help of each user profile 88 for each user along with different restrictions for each user, the smart wearable device 16 can be shared and used by multiple users, even on a daily basis.

G) Avoiding Big Brand Dominance in Smart Ring Market—With the tight integration with Public Certificate Authority, which are trusted by users all over the world, any small or medium manufacturer (e.g., startups) can launch a new smart wearable device in the market, which can have equal security features as any big brand Smart Ring.

H) Support for Guest Profile/Parental Control—The smart wearable device 16 can occasionally be shared or delegated with guests, kids, and other family members with full control over what is being purchased (e.g., allowed items, blocked items), where it is purchased from (e.g., allowed geolocations, allowed shops, etc.), which bank account is to be used (e.g., different bank accounts can be used to better track funds and for budgeting), and other restrictions or limitations.

In some embodiments, the smart wearable device 16 may be configured to support one or more guest user profiles and one or more child user profiles, where these profiles may include restrictions or Parental Locks for unwanted types of purchases. This can be performed during the initial set-up stage and/or at a later time using the set up program 64 or other app on the mobile device 18 when new profiles are to be added or changed. This may include the saving of fingerprints of new users. This provides the owner with customized control of what is being purchased, allowed areas where the purchaser can shop (e.g., based on geofencing boundary and based on the location obtained using the GPS tracker), different bank accounts for different profiles, etc.

Use Case in Industrial Internet of Things (IIoT)

Industry 4.0 has reinvented how businesses design, manufacture complex products (e.g., aircrafts, Electric Vehicles (EVs), Unmanned Arial Vehicles (UAVs), trains, etc.) in High Security Large Manufacturing Plants with the usage of Robotic Automation and advanced IIoT devices. If the Plant has different Areas for different component manufacturing and assembling, then each Area will have different Access Controlled Gates. Based on the Job requirement, Workers can be given access to, perhaps, two or three Areas in the Plant dynamically. (Gate access can change every week.) If a Company provides the smart wearable device 16 (Smart Rings) to workers, then the same device can be used by three different workers at different eight-hour shifts (i.e., Multiuser Application) to access different Gates as per the Dynamic Access. Workers can receive virtual currency/credit points of the Plant whenever finishing a batch of component manufactured in a Day using the Ring. Different Robots and Devices can be interacted/controlled by the Workers Smart Ring based on who has what level of access to these devices (i.e., Ring Profile restrictions). Continuous Health monitoring of the Smart Ring will trigger automated alerts to the Employer to deploy quick medical assistance whenever any Worker is not well during Shift.

Use Case in Consumer Electronics

In high population countries like India and China, conducting any Academic/Job related Exam is expensive, where the number of candidates participates in those exams can be as high as 1.5 million (e.g., India's UPSC Exam, CAT exam, Gate Exam, etc., which happen every year). Due to the high volume of candidates, it is very tough to organize such exams in a fully Computerized Test. That is, it is not feasible to accommodate so many Computers in so many cities in the Country. Hence, there are still classic Pen & Paper Exams being conducted in these countries. Ensuring that no malpractice (e.g., question leaks, cheating, etc.) happens during an exam is an even more difficult task, considering the scale of these exams, as Exam centers barely have adequate CCTV surveillance systems and guards. Moreover, it is impossible to Audit the authenticity of the 0.1% selected candidates (if they were clean during exam) in a later period of time (e.g., after the final result is declared) by just analyzing CCTV footage, which does not record enough data about any single candidate.

If Government and Large Corporations, who conduct such Exams every year, deploy Multiuser Smart Ring, they may track health metrics, emotional excitement graphs, GPS location, Date, Time, etc. Then, the same Ring can be reused by Multiple candidates (in multiple exams during a year) and Each Candidate recorded Data will be quite easy to store and analyze (as Ring does not record Video unlike CCTV) for Future Audits.

Artificial Intelligence can be combined with live tracking of Smart Ring data to detect any malpractice done by candidates in real time during Exam by detecting sudden spike in heart rate or blood pressure and other excitement symptoms. With extensive audits of the stored Smart Ring data, it is also possible to detect malpractice even after multiple weeks/months of the Exam.

Session Certificates for Smart Ring

The present disclosure relates to systems and methods for establishing Digital Trust in the eco-system of sustainable and reusable Smart Rings or other smart wearable devices. A session certificate, in the context of computer security and network communication, typically refers to a cryptographic certificate used to establish and manage secure sessions between two entities, such as a wearer of the Smart Ring and a PoS terminal 24 or bank 22. When two parties communicate over the network 12, they often want to ensure that their communication is secure and not susceptible to eavesdropping or tampering. Secure communication protocols (e.g., Transport Layer Security (TLS), Secure Sockets Layer (SSL), etc.) are commonly used for this purpose.

During an initial handshaking process of these protocols, the smart wearable device 16 can present its digital certificate to the POS terminal 24 or bank 22 to prove its identity. This certificate may include a public key associated with the bank 22 and may be signed by the CA 14. The smart wearable device 16 can verify the authenticity of the certificate by checking its signature against the public key stored at the CA 14, thus establishing trust in the identity of all applicable parties.

Once identity is verified, the smart wearable device 16, bank 22, and CA 14 can exchange cryptographic keys and negotiate parameters for secure communication. This negotiation typically results in the generation of session keys, which are used to encrypt and decrypt the actual data exchanged during the session. The session certificate, therefore, may refer to the certificate used during this initial handshaking process to establish a secure session. It can be used to authenticate the server to the client and initiate the secure communication channel.

Additional Limitations of Conventional Smart Rings

Conventional Smart Rings have a One to One tight coupling between a Smart Ring and a Specific App. That is, the Smart Ring cannot be used by two different Payment Apps. Sharing the security PIN with Guests/Kids (if delegating the Smart Ring usage with others) can be a nightmare for auditing monthly account usage statements with no record keeping for users.

Conventional Smart Rings come with a Fixed Size. Thus, most of the time, only one person can wear it comfortably. The Smart Ring can only be used like a Prepaid Wallet where User has to pre-load some limited amount of money (e.g., max of £500).

Conventional Smart Rings usually have a Lack of Security Features. Hence, a user can use it mostly for low amount transactions without inputting the Security PIN. For every high value transaction, the User may need to enter the security PIN in the POS terminal 24. In case of theft, a malicious person can do multiple low value transactions using the Smart Ring by tapping multiple times in the POS terminal 24 before the Owner may be able to actually block the Ring usage. Also, one User may need to purchase multiple Smart Rings from the same vendor to isolate usages between types of Transactions (e.g., Personal, Business, Travel, etc.).

Conventional Smart Rings may expire after a period of about 3-4 years, when a new Ring has to be purchased. If a user purchases two Rings for personal use and they expire after 3 years, then it can be concluded that the user will go through a huge number of Rings, which are then thrown away. After 10-20 years, if Smart Rings become as popular as mobile phones (i.e., the current number of mobile phone users is 7.33 billion or 90.93% of the world's population). Thus, this could lead to huge e-waste creation in the future. However, the present disclosure proposes sustainable and reusable Smart Rings, which can be used by multiple users with various user profiles 88 stored therein. Also, the Smart Ring of the present disclosure has better security features by introducing Session Certificates for the Smart Ring transactions. With this solution, the smart wearable device 16 described herein can be used by multiple users, even on a daily basis (i.e., different times of the day) in a shared usage mode.

Use Case of Large Manufacturing Plant

Suppose a highly secured Large Manufacturing Plant has 10-15 areas (or blocks) where different components of the same product are manufactured and then assembled. Each area or block is access-controlled and is audited with respect to each entry and exit and the timings of each entry and exit. Let's say Workers follow an eight-hour shift. Due to safety hazards, all Workers needs to wear an Employer Provided Smart Ring to audit their on-the-job health condition and precise location tracking to determine how many times the worker enters a designated area and leaves the designated area or moves from one area to another for collaboration purposes or to move component materials in various area blocks. In such case, if the total headcount is 9000 and each shift has 3000 workers, then the Employer can deploy 3000 Smart Rings to audit the Health and Location activities of each Worker. After completion of a Shift, each Worker can transfer their Smart Ring to the next Shift Worker. Each Worker will do login and logout activities at the Campus entrance and may need to access all internal entry-exit points in the different blocks of the Campus using their Smart Ring. The Employer can deploy instant medical treatments if any Worker Smart Ring triggers any health condition alerts. The Employer can also track Materials movement and potential bottlenecks in the overall Campus accurately in real time.

Digital Certificates

The Certificates 84 may include a Device Certificate and an Embedded Certificate from the CA 14. The smart wearable device 16 may be embedded with a Root Certificate that is signed by the CA 14 (e.g., DigiCert), which may be used to uniquely identify the smart wearable device 16 and may be configured to provide information (e.g., unique serial number, manufacturer ID, release date, physical form factor details, hardware component details, etc.) as needed.

Also, the Certificates 84 include a short-lived Session Certificate. Since many use cases of Smart Rings involve the action of making digital payments, the smart wearable device 16 described herein is configured to utilize the Session Certificate that is short-lived (e.g., a maximum of about 15 minutes of inactivity), where exceeding this time limit is configured to terminate any ongoing sessions. The Session Certificate may be signed by the embedded Root Certificate in the smart wearable device 16. The Session Certificate can uniquely identify the current user and automatically identify the designated user profile for the debit/credit payment activity.

Embedded User Profile

Considering that the smart wearable device 16 may be used by multiple users, a unique User Profile 88 can be stored in the memory 74 of the smart wearable device 16. Each User Profile 88 may contain a unique ID (e.g., Social Security number, email ID, etc.), full name, emergency contact address, geofencing data showing usage of the smart wearable device 16 (i.e., a virtual perimeter for a real-world geographic area), Wallet details for Payment activities, etc.

While setting up the User Profile 88 in the smart wearable device 16, the user can also slide a specific finger (e.g., ring finger) and detect each sector of the fingerprint as described with respect to FIG. 8. This can be done by serially positioning the embedded fingerprint sensor 80c. There may be four to eight sections 96 or sectors of the fingerprint 98 can be scanned, according to various embodiments. This may be based on the length of the finger, where four sectors may be sufficient for a small length finger. In some cases, a user might wear the device all day, but may only need to create a Session only once or twice in a day when the User tries to perform a payment related activity.

Sliding Fingerprint to Start Session

According to some embodiments, once the User has setup the Session Profile (i.e., all fingerprint sectors are saved in the Ring), the User can initiate a Session by sliding out the Smart Ring to the tip of the finger (FIG. 11B) and let the fingerprint monitoring devices 80 or fingerprint sensors 80a, 80b, 80c detect the first sector. Once detected, the LED indicator can give the status of the Session and may turn from red to yellow (e.g., a default color may be red). Once the LED shows yellow, the User can then slide the Ring inwards (toward the base of the finger) so that the fingerprint monitoring device/sensor can detect the second sector. The LED may then turn green after detecting both the first and second sectors of the fingerprint 98.

A Session activity may include the following steps:

Step 1) The user is wearing the Smart Ring while standing in a queue at a Purchase Counter.

Step 2) The User starts the Session by sliding the Ring outwards (FIG. 11A) as shown by the arrow.

Step 3) The User holds the Ring at a first point (as shown in FIG. 11B) to allow the first sector 96-1 to be detected by the fingerprint sensor 80c. The LED indicator turns yellow.

Step 4) The User slides the Ring inwards (as depicted by the arrow in FIG. 11B) and holds the Ring at a second point (as shown in FIG. 11B) so that fingerprint sensor can detect the second sector 96-1 of fingerprint 98. Upon successful detection, the LED indicator turns green. In some embodiments, the indicator may stay green for the duration of the purchase process (e.g., maximum of 15 minutes).

Step 5) The User can then slide the Ring to an extremely inward position (i.e., the original position of Ring).

Step 6) The Indicator is Green and Ring is at Original Position. At this stage, the User can make a first gesture and/or tap on the POS terminal 24 to complete the transaction. At this point, one Session Certificate can be transferred from the Ring to the PoS terminal 24, which may then be redirected to the corresponding bank account of the User to update the Account Balance.

Automatic Session Termination

According to some embodiments, if the User has initiated a Session but has not done the Payment transaction yet (i.e., max time is exceeded) and some malicious person forcefully removes the Ring from the Owner's finger, the Session will be automatically terminated. The Session Start occurs from outward sliding of Ring (FIG. 11A) immediately followed by the inward sliding (FIG. 11B) with a short pause to detect the fingerprint. After Session is started, only an inward sliding motion of the Ring is allowed for Session Start. Hence, any significant outward sliding activity (i.e., to remove Ring from finger again) may automatically be detected by the Motion Sensors in this embodiment. Also, the Session may be terminated immediately (and the LED turns to RED again).

In some cases, the Ring Owner can change his or her mind about the purchase and decide not to make a Payment Transaction after Session has started. In this case, the Ring Owner can just slide the Ring outward (not removing the Ring, but just sliding out an inch or so and again placing it back). This may also be done to terminate the Session.

Session Certificate Properties

A Session Certificate may contain a unique Session ID, a Timestamp of detecting the first sector 96-1, a Timestamp of detecting the second sector 96-2, a current GPS location of the Ring, an Average Heart Rate over a last period of time (e.g., 2 minutes), a Unique ID of the User (e.g., email, SSN, etc.), Full Name of the User, Mobile Number, the payment type, Credit or Debit, Payment Amount, etc. The Certificate containing this unique data about the User can be used to ensure the authenticity of the User and the certificate can be stored in the bank 22 or a Payment Gateway database for future audit purposes.

Embedded Session Validation

In some embodiments, when the User is trying to start a Session, the Embedded Validation rule of the Smart Ring may include first validating the Session start request. If everything looks good, then only the Session may be started (and LED turns green). The User may set up all validation rules during Ring Profile Setup. For example, the user might enable a geofencing feature on the Smart Ring, which means that if the current location of the Ring is outside of the permitted GPS area, then the Session Start Request will be rejected (and LED turns RED). Similarly, in some embodiments, if the User Heart Rate is above a certain predefined limit (as stored in the user profile 88), this may mean that the User is under duress or is having some health condition. In this case, the Session Start request may also be rejected. However, the user may wish to bypass the heartrate monitoring limitation in the user profile if he or she chooses. For example, the user may often go to the gym while wearing the Smart Ring and often purchases a Gatorade at the end of the workout when his or her heart rate is high.

Digital Trust in Smart Ring Eco-System

Currently, conventional Smart Rings are configured using the Manufacturer provided Smartphone App. Every App has a different user interface and different use cases covered. Due to the lack of complete Digital Trust, these Smart Rings are not recognized by Banking platforms. Hence, Payment cannot be done from a Bank account directly using the Smart Ring. Instead, some Prepaid Wallet is provided by the Smart Ring manufacturer to load money from Bank Account. Then, the user can use the Smart Ring for Payment transactions.

However, with the smart wearable devices 16 described in the present disclosure, the trust system 10 can establish complete Digital Trust between any Vendor's Smart Ring and any Banking Platform. The CA 14 (e.g., DigiCert) may be responsible for verifying the Ring Owner's authenticity during the Smart Ring activation and User Profile setup. A government ID (e.g., driver's license, passport, etc.) may be used in many cases to open a Bank Account, which is also recorded during the Ring Setup and User Profile Setup. The User may also upload a video containing his or her face, sample hand gestures, etc. in order to provide Know Your Customer (KYC) information for verification. The ID and KYC information can be provided in the Smartphone App (e.g., set up program 64, certificate program 66). If the Ring Owner is registering with multiple email IDs and mobile numbers, they may all be OTP verified during the Ring Profile Setup. Every Smart Ring Manufacturer who is onboarding into a corresponding Platform of the CA 14 for registration of devices and users must adhere to all the capabilities in the Manufacturer's Smartphone App.

Use Case for Travelling Employee

Suppose a Corporate Employee who needs to travel to multiple cities on a daily basis, as required by the job. For this person, all the expenses need to be tracked meticulously for end of the month reimbursement purposes. Due to a lack of audit capabilities and security restrictions in the Employer provided Credit Card and other conventional methods, the Employee may normally need to collect and submit all bills to the Employer, which has to be audited by the Employer along with that Corporate Credit Card statement before settling Monthly reimbursement.

However, with the proposed solution of the present disclosure, the Employer can setup a Smart Ring as the Owner and can attach a Corporate Bank Account with the Smart Ring along with various Profile Validation Rules (e.g., usage restrictions), such as an allowed list of corporate Payment activities (e.g., which kinds of transactions are allowed with the Smart Ring).

Certain outlets of expensive restaurant chains or alcohol-serving pubs may be blocked. A predefined multi-city based geofencing strategy may be instigated to block Smart Ring usage outside of the allowed GPS areas, blocking certain personal purchase items (e.g., movie tickets, concert tickets, etc.) with the Employer provided Smart Ring. Hence, the current solution is configured to remove the hassles of collecting bills and auditing the monthly expense report rigorously. Instead, the Employer can set up the restrictions upfront with a much detailed monthly Dashboard Report for each employee (who is assigned a Smart Ring) with thorough tracking of every Payment activity, including GPS location of Transactions, and other details about Transactions.

Thus, the present solutions may reduce the hassles of transferring the Corporate Credit Cards (or block card and issued new Card) whenever an employee leaves Organization, because all employees are treated as "Guest Users" of the Smart Ring. Then, the Employer can easily deactivate a Guest Profile in the Smart Ring for an ex-employee and activate a new Employee Guest Profile for new employees. This may also include transferring or sharing Rings among employees.

The present Smart Ring embodiments can be used along with a Reward Points management Tool. The more transactions that occur through the Smart Ring, the more Reward Points the user can get. The Reward Points can be stored in the Smart Ring and can be redeemed later in various outlets. These and other use cases provide endless possibilities based on this Secure Transaction capabilities described herein with respect to the smart wearable device 16, Smart Ring 90, and other embodiments described herein.

Apple (iOS) and Google (Android) already have well-established security frameworks. However, with the embodiments of the present disclosure, it is possible to open the market to newcomers who may use the CA 14 certification functions for verifying users and smart wearable devices. Currently, one can use his or her mobile device for payments, purchasing tickets, etc. Trust in these mobile devices (e.g., Apple Wallet) by banks already exists. However, this does not exist for other conventional wearables, such as Smart Rings. However, with the trust system 10 and certificates issued from a reputable CA 14, trust in the arena of smart wearable devices can be applied in a similar way as currently trusted mobile phones.

X.509 Certificate

A certificate authority is an entity that stores, signs, and issues digital certificates. This allows others (relying parties) to rely upon signatures or on assertions made about the private key that corresponds to the certified public key. A CA acts as a trusted third party—trusted both by the subject (owner) of the certificate and by the party relying upon the certificate. For certificate authorities, existing individual validation processes involve the use of third-party verification services to validate basic individual information such as first name, last name, professional title, etc. However, these processes do not include the option to validate and incorporate an individual's crypto wallet address. As cryptocurrency becomes more prevalent, there is an increasing need for a secure, verified method of associating crypto wallet addresses with individuals.

Again, the present disclosure includes wallet information in an X.509 certificate that is issued from a trusted certificate authority. For example, the wallet information can be included in the Subject Alternative Name (SAN) field of an X.509 certificate. The present disclosure enhances the existing individual validation process by incorporating the option for an individual to supply a crypto wallet address. This address is captured, validated, and stored in a database along with the individual's basic information. An X.509 personal certificate containing all the individual information, as well as the wallet address, is then generated, which can be used to sign digital content.

X.509 certificates are defined by ITU X.509, Information technology—Open Systems Interconnection—The Directory: Public-key and attribute certificate frameworks, October 2019, the contents of which are incorporated by reference in their entirety. An X.509 certificate binds an identity to a public key using a digital signature. A certificate contains an identity (a hostname, or an organization, or an individual) and a public key (e.g., RSA, DSA, ECDSA, ed25519, etc.), and is signed by a certificate authority. X.509 also defines certificate revocation lists, which are a means to distribute information about certificates that have been deemed invalid by a signing authority, as well as a certification path validation algorithm, which allows for certificates to be signed by intermediate CA certificates, which are, in turn, signed by other certificates, eventually reaching a trust anchor. When a certificate is signed by a trusted certificate authority, or validated by other means, someone holding that certificate can use the public key it contains to validate documents or content digitally signed by the corresponding private key.

In an embodiment, an X.509 certificate can be used to digitally sign content. A content signing certificate allows individuals, teams, and organizations to add an electronic, digital signature to a document or other content in a variety of file formats to prove ownership. The digital signature is an encrypted hash of your message that can only be decrypted by someone who has a copy of your public key, which ensures (1) content stays unaltered, (2) the creator's identity is confirmed, and the like.

A digital signature cryptographically binds a digital signature certificate, issued by a trust services provider (TSP), to a document using public key infrastructure (PKI) technology. Digital signatures validate and authenticate signer identity and document integrity, delivering higher levels of assurance that the signer is who they say they are and that the document has not been altered. Digital signatures are ideal for transactions that require higher level of security and are necessary in certain countries and regions where companies are required to comply with legal regulations. In some countries, some forms of digital signatures have legal validity equivalent to handwritten signatures.

In another embodiment, the X.509 certificate can be referred to as a personal certificate, i.e., it does not necessarily need to be used to digitally sign content. In a further embodiment, the X.509 certificate can be a content credential that includes history and identity data attached to content. A user can view this data when a creator or producer has attached it to content to understand more about what has been done to it, where it has been, and who is responsible. Content credentials are public and tamper-evident, and can include info like edits and activity, assets used, identity info, and more.

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A smart wearable device comprising:
memory configured to store one or more certificates issued by a Certificate Authority (CA), the one or more certificates enabling a user of the smart wearable device to digitally verify his or her identity for performing a security-based action; and
a Near Field Communication (NFC) device configured to wirelessly link with a security terminal to perform the security-based action when the identity of the user is verified, wherein the NFC device is configured for communication with one or more of a pairing device, a secure device, and a Point-of-Sale (POS) terminal,
wherein the pairing device is a mobile phone having an application configured to assist the user with entering set-up parameters for defining operations of the smart wearable device and to download a digital trust certificate from the CA to the smart wearable device for establishing digital trust.

2. The smart wearable device of claim 1, wherein the one or more certificates include at least a device certificate configured to store one or more of a serial number of the smart wearable device, an identification code related to the smart wearable device, and manufacturing information of the smart wearable device.

3. The smart wearable device of claim 1, wherein the one or more certificates include at least a digital trust certificate configured to store one or more of the identity of the user, personal information regarding the user, a user profile, and purchase details of the smart wearable device.

4. The smart wearable device of claim 1, wherein the one or more certificates include at least a session certificate enabling the user to perform the security-based action according to one or more preset limitations.

5. The smart wearable device of claim 4, wherein the one or more present limitations include one or more of a time limitation in which a purchase can be made, parental control limitations, a spending limitation, geofencing limitations, and purchase type limitations.

6. The smart wearable device of claim 1, wherein the secure device is one or more of a physical access control terminal, a personal medical sensor, a home security system, and a baby monitor.

7. The smart wearable device of claim 6, wherein the security-based action includes one or more of entering or leaving a restricted area using the physical access control terminal, accessing health information from the personal medical sensor, and accessing video footage from the home security system or baby monitor.

8. The smart wearable device of claim 1, wherein the POS terminal is configured to enable a purchase using funds in a bank account associated with a bank of which the user is a customer, and wherein the security-based action is a purchase process utilizing the PoS terminal.

9. The smart wearable device of claim 1, wherein the smart wearable device is a smart ring.

10. The smart wearable device of claim 9, wherein the smart ring has an adjustable band to accommodate different finger sizes for multiple users, and wherein the memory is configured to store a unique user profile for each user.

11. The smart wearable device of claim 9, wherein the smart ring includes one or more fingerprint sensors for detecting a fingerprint of the user in order that the identity of the user can be verified.

12. The smart wearable device of claim 1, wherein the smart wearable device is one of a smart watch, a smart wrist band, a smart necklace, smart clothing, smart shoes, and smart headwear.

13. The smart wearable device of claim 1, further comprising one or more of a heart rate monitor, an oxygen saturation monitor, a sleep monitor, a body temperature monitor, a glucose monitor, a step tracker, a motion detector, an accelerometer, a location determination device, and a rechargeable battery.

14. A Certificate Authority (CA) system comprising:
a processing device; and
memory configured to store computing logic having instructions that, when executed, cause the processing device to perform steps of
issuing one or more certificates to a smart wearable device to digitally certify an identity of the smart wearable device and a user of the smart wearable device, the one of more certificates establishing a security framework for digitally verifying the identity of the smart wearable device and user, and
issuing a session certificate to the smart wearable device to enable the user to perform one or more security-based actions,
wherein the computing logic is a certification program for certifying a plurality of smart wearable devices and for certifying multiple users of each of the smart wearable devices.

15. The CA system of claim 14, wherein the instructions further cause the processing device to download an application to a mobile device configured to be paired with the smart wearable device, the application configured to at least conduct a set-up procedure for enabling the user to enter personal information and banking information for at least the user.

16. A non-transitory computer-readable medium of a mobile device, the non-transitory computer-readable medium configured to store logic having instructions that, when executed, enables a processing device to:
pair with a smart wearable device to enable Near Field Communication (NFC) with the smart wearable device; and
guide a user of the smart wearable device through a set-up procedure to download a digital certificate from a Certificate Authority (CA) to the smart wearable device,
wherein, when the smart wearable device is linked with a security terminal, the digital certificate enables the user to perform one or more security-based actions when an identity of the user is verified.

17. The non-transitory computer-readable medium of claim 16, wherein the instructions further enable the processing device to establish banking limitations with respect to use of the smart wearable device at a Point-of-Sale (POS) terminal.

* * * * *